US006781118B2

(12) United States Patent
Fuerstenau

(10) Patent No.: US 6,781,118 B2
(45) Date of Patent: Aug. 24, 2004

(54) PARTICLE CHARGE SPECTROMETER

(75) Inventor: Stephen D. Fuerstenau, Montrose, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 10/053,343

(22) Filed: Jan. 17, 2002

(65) Prior Publication Data

US 2002/0125422 A1 Sep. 12, 2002

Related U.S. Application Data

(60) Provisional application No. 60/262,497, filed on Jan. 17, 2001.

(51) Int. Cl.[7] .......................... H01J 39/34; G01N 21/00

(52) U.S. Cl. ....................................... 250/282; 250/281

(58) Field of Search .................................. 250/282, 281

(56) References Cited

U.S. PATENT DOCUMENTS

| | | | | |
|---|---|---|---|---|
| 4,010,366 A | * | 3/1977 | Neukermans et al. | 250/282 |
| 4,633,714 A | | 1/1987 | Mazumder et al. | |
| 4,917,494 A | | 4/1990 | Poole et al. | |
| 4,938,592 A | | 7/1990 | Poole et al. | |
| 5,641,919 A | | 6/1997 | Dahneke | |

OTHER PUBLICATIONS

Gajewski, J.B. and A. Szaynok, Journal of Electrostatics, vol. 10 (1981) p. 229.

* cited by examiner

*Primary Examiner*—John R. Lee
*Assistant Examiner*—James J. Leyourne
(74) *Attorney, Agent, or Firm*—Fish & Richardson P.C.

(57) ABSTRACT

An airflow through a tube is used to guide a charged particle through the tube. A detector may be used to detect charge passing through the tube on the particle. The movement of the particle through the tube may be used to both detect its charge and size.

21 Claims, 3 Drawing Sheets

PARTICLE CHARGE SPECTROMETER

CROSS-REFERENCE TO RELATED APPLICATIONS

The present application claims priority from provisional application No. 60/262,497 filed Jan. 17, 2001.

STATEMENT AS TO FEDERALLY-SPONSORED RESEARCH

The invention described herein was made in the performance of work under a NASA 7-1407 contract, and is subject to the provisions of Public Law 96-517 (U.S.C. 202) in which the contractor has elected to retain title.

BACKGROUND

Determination of particle charge may be important in certain problems related to monitoring indoor and outdoor environments, geological and other atmospheric processes, as well as the processing and handling of industrial powders.

Instruments that measure charge on particles have typically employed indirect measurement techniques in which the particle is exposed to an electrical field while the particle motion in response to the field is monitored optically or by other means. Electrical mobility analyzers are an example of an indirect measurement but particles having a size range greater than a few micrometers are not easily handled by electrical mobility analyzers, which require a relatively high electric fields.

Furthermore, electrical mobility analysis generally bases the measurement on the assumption that the particle carries at most one or two electrons of charge in order to provide size information about the particle. Other indirect particle charge measurement devices may include single particle traps and balances. While these may be relatively sensitive, they are not easily automated, and it may be difficult to use these devices to obtain rapid measurements.

The single particle aerodynamic relaxation time (SPART) analyzer is described in U.S. Pat. No. 4,633,714: Aerosol particle charge and size analyzer. This is another indirect approach device which acquires images of tracks of aerosol particles falling through an oscillating electric field, locates pixels in each image that form the individual tracks, and forms non linear curve fits of the tracks in order to determine track parameters. These parameters are used to estimate the size of each particle and the charge on each particle. This device may be physically very large and costly to build.

Other aerosol instruments measure the particle aerodynamic diameter (but not charge) by monitoring the motion of particles due to an accelerating flow. The Aerosizer, made and marketed by TSI, Inc is described in U.S. Pat. Nos. 4,938,592; 4,917,494; and 5,641,919. The Aerosizer instrument particles velocities are determined in the expansion region of a free jet after the particle acceleration is virtually complete. Furthermore, its velocity measurements do not make use of an induced electrical signal from individual particles.

Published research has demonstrated the use of a cylindrical electrode to sense the charge on particles in a carrier gas transported through a relatively large diameter conduit with glass walls (eg. Gajewski, J. B. and A. Szaynok, Journal of Electrostatics, vol. 10, (1981) page 229). However, that work is concerned strictly with the measurement of charge carried by ensembles of particles, not the measurement of charge on individual particles.

SUMMARY

The present application teaches a device which may measure the charge and size of a large number of airborne particles. The charge on an individual particle may be detected by using a gas flow to draw a particle through a cylindrical electrode that acts as a Faraday cage.

According to an embodiment, an imposed gas flow inside a dielectric capillary tube may be used to guide the particle through the charge sensing volume. The charge is sensed through the capillary tube.

The gas stream to draw the particle through the cylindrical sensing region may accelerate particles of different sizes accelerate at different rates in the flow. This may allow measurement of particle size via velocity observation.

One use of the present system is in determination of electrostatic charge on individual particles or droplets suspended in a gas. The system may also be used to simultaneously determine the aerodynamic diameter of each charged particle that is measured.

BRIEF DESCRIPTION OF THE DRAWINGS

These and other aspects will now be described in detail with reference to the accompanying drawings, wherein.

DETAILED DESCRIPTION

Figure 1:
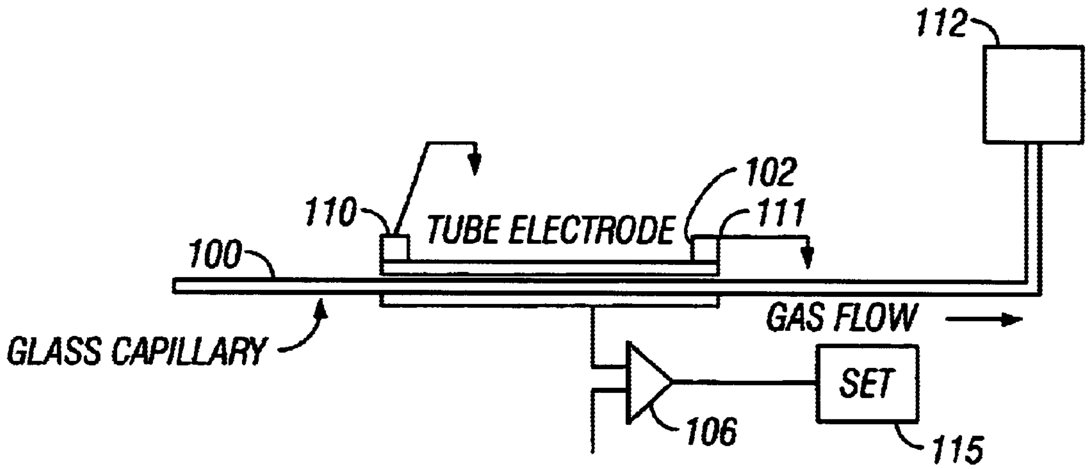
FIG. 1 shows a basic layout of the particle sizing device.

The present application defines a device that may detect charge on individual particles by using gas flow to draw particles through a tube to the electrode. Use of the gas flow has a significant benefit, since the particles of different sizes accelerate at different rates within the flow. This makes it possible to determine size of the particles by investigating their velocity. The present system monitors the particle motion while it is in a gas stream with a constant velocity, i.e. inside a capillary, unlike systems such as the Aerosizer that looks at the particles after acceleration.

The present system uses a direct charge measurement approach. A charge sensitive amplifier is used to measure the charge induced on an electrode by the arrival or passage of a charged particle. Since measurement of induced signals is carried out, the present system may be formed very simply.

One embodiment that is disclosed herein monitors the charge induced on a conducting cylinder as the particle passes through a glass capillary within the cylinder. Instruments for measuring charge and particle velocity based on conductive cylinders have been reported in the meteorological instruments community. See for example, Gunn, R., and G. D. Kinzer, 1949: The terminal velocity of fall for water droplets in stagnant air. J. Meteor., 6, 243–248.)

An example of this approach is described in U.S. Pat. No. 5,770,857. This system measures charge and velocity of ions and particles in a molecular beam inside a vacuum chamber. This patent includes a discussion of the type of ultra-sensitive electronics that may be used in the present invention. To summarize that discussion, the sensing electrode may include an electrically isolated conductor with a hollow geometry such that the conductor walls will intercept a majority of the electric field lines emanating from a point charge inside the electrode. A charge inside this volume will induce a voltage on the cylinder walls that can be detected. This arrangement is termed a Faraday cage. The electrode is connected to the high impedance input of a field effect transistor. Feedback forms the front end of a low-noise charge sensitive preamplifier. The noise can be further reduced by the use of shaping electronics which function as a noise rejecting band-pass filter tuned to the transition time of the particle arrival and exit.

Many previous devices have relied on gravity, ambient air currents, i.e. wind, or a ballistic launch of particles as in a molecular beam apparatus, in order for the particles to transit the conducting cylinder. The present invention describes using a forced and regulated carrier gas stream to bring particles into and out of the conducting cylinder in a rapid and controlled fashion. By using rapid particle motion, e.g., ~100 meters per second, reduced noise pulse processing techniques may be used on the amplified signal. The gas stream also assures that a large number of particles will be sampled and made to transit a cylinder with millimeter size dimensions. A small electrode dimension may also reduce the electronic noise in the system because of the reduced stray capacitance.

In an embodiment, the forced gas stream is directed through the conducting cylinder by a capillary formed of a dielectric material such as glass or any other dielectric material, e.g., with a dielectric constant less than 10, more preferably less than 4. The capillary constrains the flow of the particle in a precise and easily adjustable manner but not impeding the detection of charge through the capillary wall. The electrostatic charge can be sensed across a dielectric wall but not across the wall of a grounded conductor.

An embodiment is shown in FIG. 1. A particle capillary 100 forms a device with inner surfaces that may constrain particle movement along the path defined by the surfaces. The capillary may be a tube which is 3 cm long and of any desired diameter, e.g. on the order of mm, for example 129 mm. The capillary may be formed, for example, of glass. The particle capillary passes through a Faraday cage 102 cylindrical electrode that is associated with an input of an amplifier 106. The Faraday cage may be used to detect the passage of the charged particle through the capillary. An airflow, which may be produced by air pump 112, is used to draw particles through the capillary 100. The embodiment may use grounded shield tubes on the exterior of the capillary near the entrance and exit of the conducting cylinder.

Each time a charged particle passes through the capillary 100, the charge on the faraday electrode 102 is changed. The output of amplifier 106 is directed to detector 115, which may detect parameters of the particle. The system may be formed within a housing, which may also be sealed by screwing a cover into the screw holes with a gasket. For example, the housing may be maintained within a vacuum.

An advantage of this system is the simplicity with which the hardware can be formed. The glass capillary can simply be inserted within the tube electrode 102, and passage of charged particles is carried out through the dielectric material.

Figure 2A:
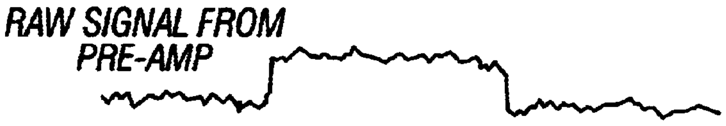
FIGS. 2*a* and 2*b* shows an oscilloscope trace of a particle trace.
Figure 2B:
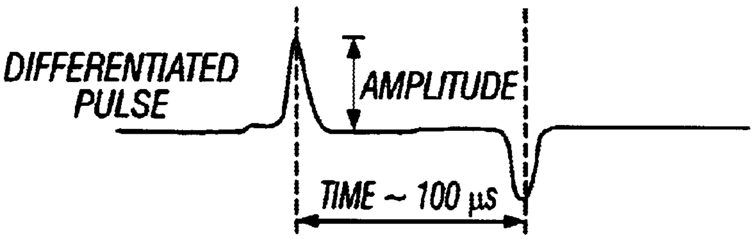

For example, FIGS. 2A–2B shows an oscilloscope trace record for the passage of a positively charged particle of about 4000 unit charges or $6.4\times10^{-16}$ Coulombs. In this embodiment, the noise level associated with the measurement is around 200 e-, but can be made lower. FIG. 2A shows the raw signal from the preamp. FIG. 2B shows the differentiated pulse from that raw signal.

The size and electrostatic charge of airborne particles and droplets may be measured as long as the particles hold a charge of more than a specified amount, e.g. more than twenty ato-coulombs (10–18 coulombs) of charge, about 100 electrons.

The trace shown in FIG. 2A represents the result of a particle transition. For example, the time that the particle takes to make its trace depends on the size of the particle. Different sized particles may have different traces. Therefore, the shape of the curve may be compared with other shaped curves by detector 115. By making this comparison, the size of the particles may be detected. For example, larger particles may accelerate slower and travel less distance based on the airflow in capillary 100. Smaller particles may correspondingly accelerate faster.

The use of a forced gas stream may also produce additional advantages, including the ability to measure particle size from the same signal used to determine particle charge. The forced gas stream moves particles of different sizes with different rates of acceleration.

Figure 3:
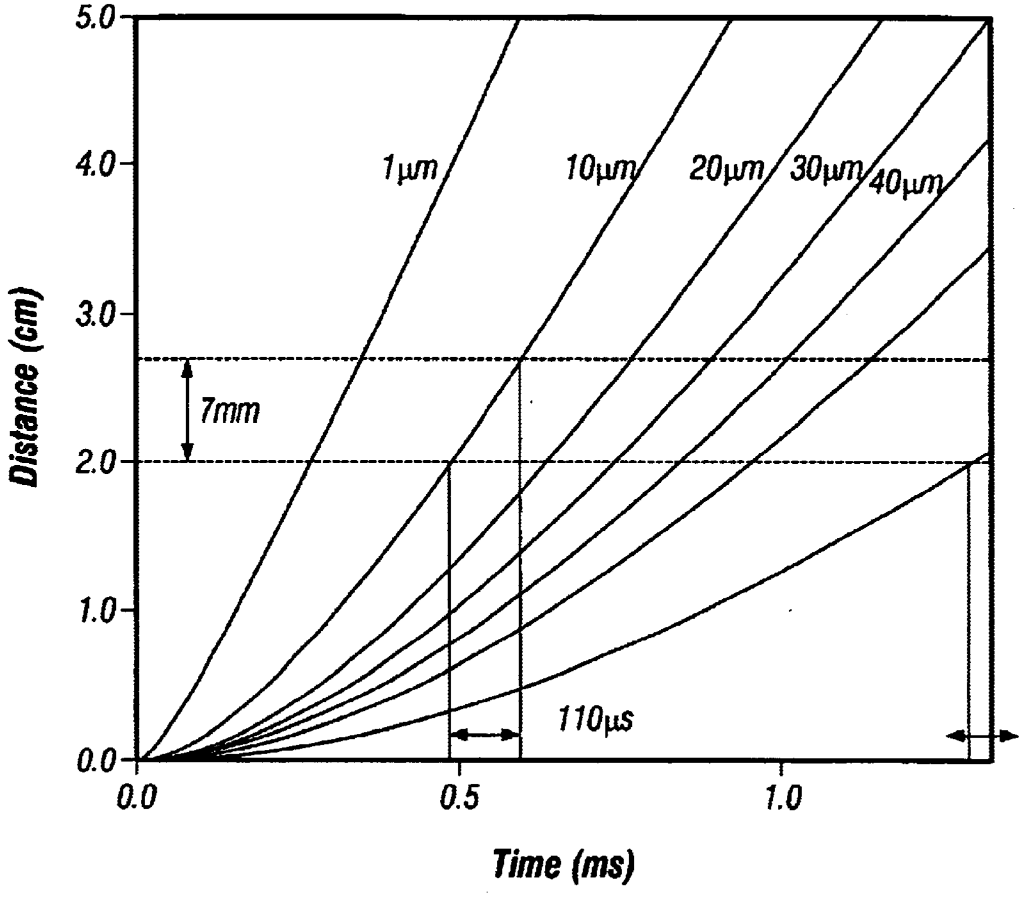
FIG. 3 shows a graph of determination of particle size as compared with transition time.

One technique of determining calculated motion of different size particles is illustrated in FIG. 3. This figure predicts the timing of particles in a 100 meter per second air stream entering a 7 mm long tube electrode situated 2 cm downstream of a capillary entrance. It is therefore possible to measure the size of particles by determining their rate of acceleration. This principle is used in commercially available instruments that determine the so-called aerodynamic particle diameter.

The amplitude of the curve trace is proportional to particle charge. The duration of the trace indicates the transit time of the particle. There are a variety of signal processing techniques that can be used to obtain amplitude and duration information from pulses at rates of several hundred Hz or more.

As an alternative, a model of particle size as a function of the acceleration profile for the particle may be developed by reviewing different particles. This model may then be used to determine the particle information.

Figure 4:
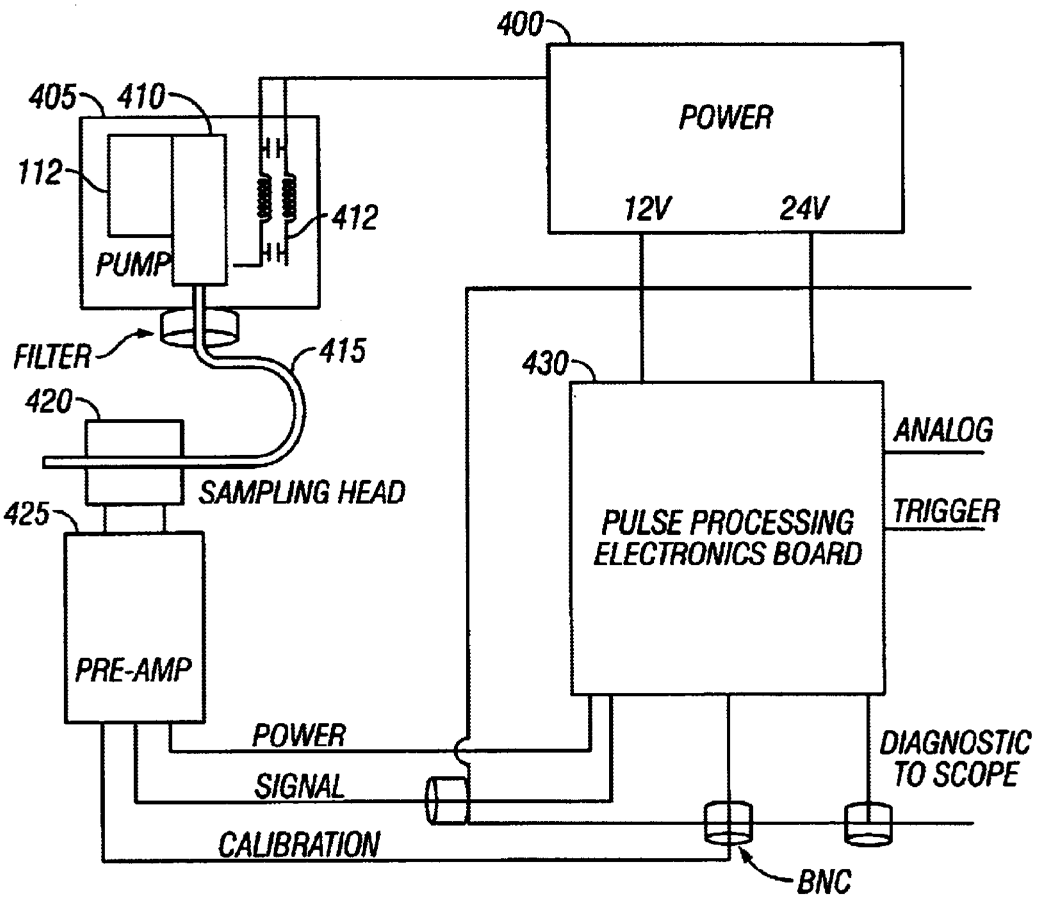
FIG. 4 shows a block diagram of the electronics layout.

FIG. 4 shows a block diagram of the electronics layout of the present system. Power from a power supply 400 is used to power all components of the system. The air pump 410 is connected to the sampling head by a flexible hose 415. The capillary and cylindrical sensing electrode are housed inside the sampling head, 420, The sampling head 420, also contains the FET and feedback elements which form the remote front end of the charge sensitive preamplifier 425. The signal from the preamp 425, is applied to the pulse processing electronic board 430. This board may process the signals using conventional techniques.

Although only a few embodiments have been disclosed in detail above, other modifications may be possible. For example, while the above embodiment has described a cylindrical electrode being used as the charge detector, any item which is capable of detecting charge in a particle passage may be used. The capillary tube may be formed of any material provided that it does not shield the signal from the sensing electrode. Moreover, the airflow through the capillary to may be formed by any means, including passive airflow. Moreover, the detector may be any electronic or optical or any other type of device which is capable of reacting to a charge.

What is claimed is:

1. A device comprising:

a particle position constraining part formed of a dielectric material, having inner surfaces;

an airflow producing part, producing an airflow within said inner surfaces to guide a particle within said inner surfaces; and a detector, which detects a charge of a charged particle in said particle position constraining part, and produces a signal indicative of a charge and a size of a particle.

2. A device as in claim 1, wherein said detector produces an output signal indicative of a charge of said particle, and a movement of said particle, and determines size of said particle from said movement of said particle.

3. A device as in claim 1, wherein said airflow producing part includes an air pump.

4. A device as in claim 1, wherein said particle position constraining part includes a capillary tube.

5. A device as in claim 1, wherein said detector includes a Faraday cage.

6. A device as in claim 5, wherein said detector includes a Faraday cage cylindrical electrode.

7. A device as in claim 5, further comprising a transistor, connected to said Faraday cage, and driven by an output of said Faraday cage to produce said signal.

8. A device as in claim 1, wherein said particle constraining part is a glass capillary.

9. A device as in claim 1, wherein said particle constraining part is a capillary having a diameter less than 10 mm.

10. A method, comprising:

using airflow to guide a charged particle, having a charge greater than a specified amount, along a path defined by a dielectric material;

sensing a charge of the charged particle along the path from within the dielectric; and producing a signal indicative of particle charge and particle size based on said sensing.

11. A method as in claim 10, wherein said producing comprises analyzing a signal produced by said sensing to determine a size of the particle.

12. A method as in claim 10, wherein said using comprises confining said charged particle within a dielectric capillary.

13. A method as in claim 10, wherein said using comprises confining said charged particle within a capillary having a diameter less than ten mm and formed of glass.

14. A method as in claim 10, wherein said sensing comprises using a Faraday cage to sense charge of this charged particle as a function of time.

15. A method as in claim 14 wherein said using a Faraday cage comprises using a cylindrical electrode Faraday cage.

16. A method, comprising:

forcing a charged particle to travel through a tube formed of a dielectric material; and detecting a charge on said charged particle through said dielectric material.

17. A method as in claim 16, wherein said forcing comprises applying a known airflow to said charged particle.

18. A method as in claim 16, further comprising detecting a size of said charged particle based on a waveform detected by said detecting.

19. A method as in claim 16, wherein said dielectric capillary has a diameter less than one mm.

20. A method as in claim 19, wherein said dielectric capillary is formed of glass.

21. A method, comprising:

sliding a first smaller diameter tube of a dielectric material into a second, larger diameter tube which is a cylindrical sensing electrode;

forming a known airflow through said first smaller diameter tube, and causing charged particles to pass through said first smaller diameter tube; and sensing passage of said charged particles using said second larger diameter tube, through said dielectric material.

* * * * *

UNITED STATES PATENT AND TRADEMARK OFFICE
Certificate

Patent No. 6,781,118 B2 Patented: August 24, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Stephen D. Fuerstenau, La Canada, CA (US); and Gregory R. Wilson, Altadena, CA (US).

Signed and Sealed this Sixth Day of November 2007.

DREW A. DUNN
*Supervisory Patent Examiner*
Art Unit 2881

UNITED STATES PATENT AND TRADEMARK OFFICE
Certificate

Patent No. 6,781,118 B2

Patented: August 24, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Stephen D. Fuerstenau, La Canada, CA (US); and Gregory R. Wilson, Altadena, CA (US).

Signed and Sealed this First Day of January 2008.

ROBERT H. KIM
*Supervisory Patent Examiner*
Art Unit 2881